United States Patent [19]

Boeglin et al.

[11] Patent Number: 4,949,319
[45] Date of Patent: Aug. 14, 1990

[54] SONAR TRANSDUCER JOINT SEAL

[75] Inventors: Richard W. Boeglin, N. Kingstown; Arthur B. Joyal, Bristol, both of R.I.

[73] Assignee: Raytheon Company, Lexington, Mass.

[21] Appl. No.: 286,688

[22] Filed: Dec. 20, 1988

[51] Int. Cl.$^5$ .............................................. G01V 1/38
[52] U.S. Cl. .................... 367/154; 367/165; 174/84 R
[58] Field of Search ............... 367/153, 154, 155, 156, 367/159, 162, 165, 167, 176; 310/337; 174/86.84 C, 101.5, 89, 84 R

[56] References Cited

U.S. PATENT DOCUMENTS

| | | | |
|---|---|---|---|
| 2,415,489 | 2/1947 | Dunsheath | 174/101.5 |
| 2,772,405 | 11/1956 | Schurman et al. | 310/337 |
| 3,939,469 | 2/1976 | Park | 310/337 X |
| 4,409,681 | 10/1983 | White | 367/155 |
| 4,450,543 | 5/1984 | Neeley | 367/154 |
| 4,462,093 | 7/1984 | Upton | 367/165 |
| 4,514,834 | 4/1985 | Hanson et al. | 367/141 |
| 4,557,348 | 12/1985 | Mifsud | 181/120 |
| 4,706,230 | 11/1987 | Inove et al. | 367/174 |

Primary Examiner—Brian S. Steinberger
Attorney, Agent, or Firm—Denis G. Maloney; Richard M. Sharkansky

[57] ABSTRACT

A seal of flexible waterproof material joins two shells, or a shell and its end plate, which are spaced at their edges to have a separation or gap between them into which the seal material loops. The seal material is attached to each shell, or to the shell and its end plate, to effect a watertight seal at the joint. When one joint edge moves radially with respect to the other edge, a low friction rolling action of the seal material accommodates the motion with low frictional resistance and low energy loss.

13 Claims, 2 Drawing Sheets

4,949,319

SONAR TRANSDUCER JOINT SEAL

BACKGROUND OF THE INVENTION

This invention relates to a watertight seal used between two parts having relative motion and more particularly to a seal to be used between moving transducer surfaces to form a water pressure tight joint with minimum acoustic energy loss.

Transducers which are to be utilized in undersea applications are constructed of an assembly of one or more deformable shells arranged in an axially displaced formation with shell end caps at the outermost extremities of the assembly and joint seals between adjacent transducer shells. The joint between the shells of the assembly and the joint at an end cap must be sealed to cause the interior of the shells to be watertight yet allow each shell to expand and contract freely with respect to adjoining shell or the shell end cap. The joint between the shells and end caps must in addition, ideally allow each shell to move freely without mechanical constraint with respect to its adjoining shell or end cap.

Existing methods of fabrication of joint seals, where the ends of the shells are axially aligned with a separation or gap between the adjacent shells, have the gap potted with an elastomer. The axial assembly of shells may alternatively be covered with an elastomer boot thick and stiff enough to withstand the operating depth water pressure. Another method for sealing adjacent shells is to provide a face sealing element, such as a gasket, between the shells and allow the face of one joint to slide on the face sealing element relative to the adjacent shell face. The aforementioned joints resist motion because of the sliding friction between surfaces or because of shear deformation of the interconnecting elastomer, both resulting in large energy losses. In addition, when a joint is potted with an elastomer or when the assembly of shells are covered with a boot, disassembly becomes difficult and usually results in destroying the sealing elastomer.

It is therefore an object of this invention to provide a joint seal which will allow freedom of motion between adjacent surfaces with minimum acoustic energy loss while providing a water pressure-tight seal and allowing disassembly and reassembly without destruction of the seal.

SUMMARY OF THE INVENTION

Accordingly, it is the general purpose and objective of the present invention to provide a seal joint which has the foregoing desirable properties. It is a further feature of this invention that the seal provided has a rolling motion which minimizes the forces necessary to move one joint surface with respect to its adjacent joint surface. A still further objective is to provide a pressure-tight joint. Another objective is that an assembled joint be capable of multiple disassembly/assembly cycles without destruction of the seal. These and other objectives of the present invention are obtained by making the seal in the form of a roll seal joint in which two shells or a shell and its end plate which are spaced so as to have a separation or gap between them joined by a rolling seal. The seal is attached to each shell or to the shell and its end cap so as to effect a watertight seal at the joint. When one joint surface moves with respect to the other, a low friction rolling action of the seal accommodates the motion. This low-friction resistance to motion provides a movable joint having low energy loss.

BRIEF DESCRIPTION OF THE DRAWINGS

The foregoing and other objectives and features of the present invention will become apparent when considered in conjunction with the specification and drawings wherein.

DESCRIPTION OF THE PREFERRED EMBODIMENT

Figure 1:
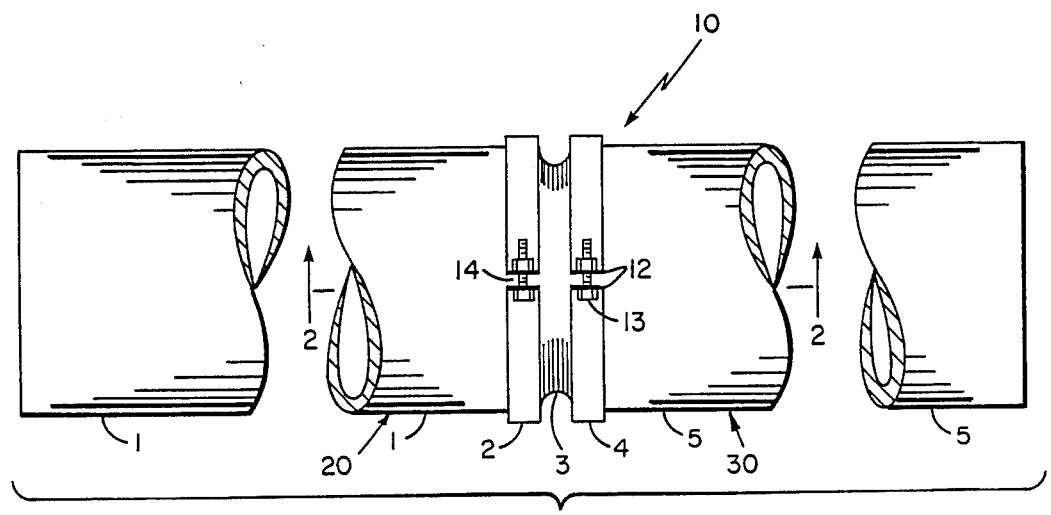
FIG. 1 shows an assembly of transducer cylinders joined with the rolling seal of this invention.

Referring now to FIG. 1, there is shown a rolling seal joint assembly 10 in which a first transducer 20 shell 1 is joined to a second transducer 30 shell 5. The transducer drive members are not shown although it will be understood that the transducers contain such drive members. Shells 1 and 5 are joined together with roll seal 3 which is retained on shells 1 and 5 by bands 2 and 4, respectively. Although the shells are shown as cylindrical, they may be elliptical or the like and may be constructed of stainless steel or glass fiber reinforced epoxy, or other suitable material known to those skilled in the art. The roll seal 3 may be constructed of a rubber impregnated fabric or other material which is highly resistant to the passage of water in which the transducers 20, 30 may be immersed to the interior of the shells 1, 5. The roll seal 3 material should also be highly resistant to passage of the gas. The seal material should also be sufficiently strong to withstand the pressure of water at great water depths without stretching substantially. The interior of the shells 1, 5 contains the drive elements for the shells in an air or a (typically sulfur hexafluoride) gas environment at substantially water-surface atmospheric pressure and the material of the seal should be impermeable to the gas. The construction of flextensional transducers having elliptically shaped shells 1, 5 and drive mechanisms, either piezoelectric, electrostrictive, or magnetostrictive, in contact with the view wall of the shell to cause deformation of the shell with consequent acoustic pressure waves is well known to those skilled in the art.

Figure 2:
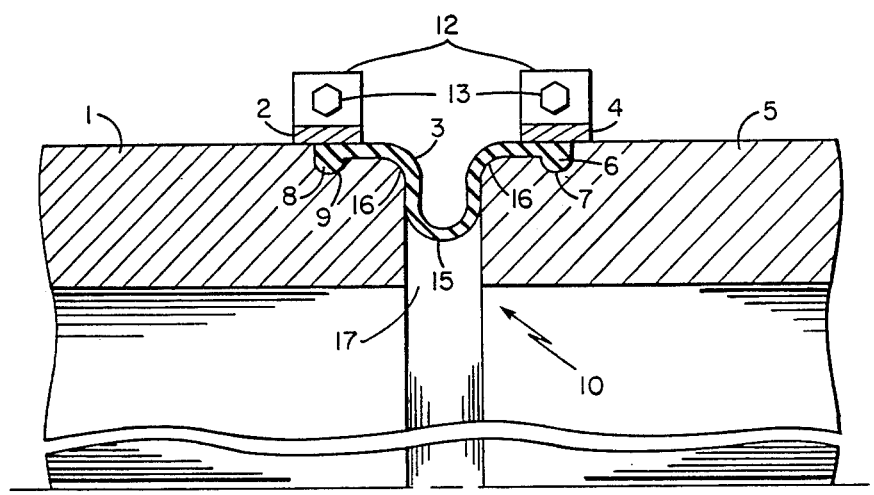
FIG. 2 is a sectional view of the joint interface area of FIG. 1 taken along line 2—2 thereof.

Referring now to FIG. 2, there is shown a sectional view of a portion of the joint assembly 10 of FIG. 1. Shells 1 and 5 are shown connected by roll seal 3 which has a bead 8 fitted into a mating groove 9 of shell 1 retained in position by joint band 2. The other end of roll seal 3 has a bead 6 which is fitted into a mating groove 7 of shell 5 and retained in position by joint band 4. Since roll seal 3 must provide a watertight seal at great ocean depths, the joint bands 2, 4 must exert substantial pressure on the roll seal 3 at the beads 6, 8. One way of achieving this objective is to provide the joint bands 2, 4 with radially extending ends 12 having coaxial holes through which bolt 13 extends. The space 14 between the band ends 12 is reduced by tightening of the bolt 13 thereby exerting radial pressure upon the beads 6, 8.

Figure 3:
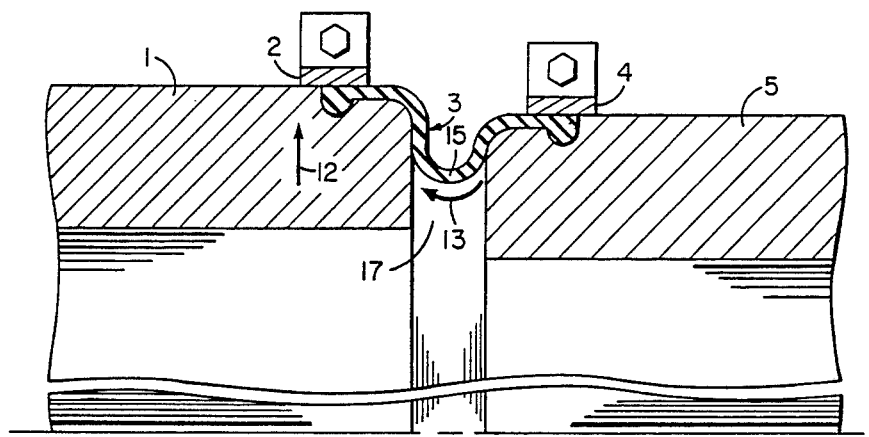
FIG. 3 shows a sectional view of the joint interface area of FIG. 1 taken along line 2—2 with one shell shown in an expanded state with respect to the other.

The roll seal 3 has a loop 15 of U-shaped cross-section shown in FIGS. 2, 3 to allow a rolling motion shown by direction arrow 13 of the loop 15 as shown in FIG. 3 for that circumferential portion of shell 1 when it expands radially with respect to shell 5 as shown by direction arrow 12 in FIG. 3. In a flextensional transducer, there will be a radial contraction of the shell 1 at a different circumferential portion, and the seal will roll in a direction opposite that of direction arrow 13 with respect to an axially adjacent portion of shell 5. Thus, the seal 3 can accommodate relative motion of adjacent shells in either radial contraction or expansion. Loop 15 is located in gap 17 between adjacent shells 1, 5 and extends radially downward in gap 17. Shells 1 and 5 desireably have a large edge radii at edges 16 to prevent the seal 3 from being overstressed where it makes edge 16 contact with the shells. Assembly of the joint seal 10 is accomplished by placing the roll seal 3 material with beads 6, 8 in mating grooves 9, 7, respectively, after which the joint bands 2 and 4 are tightened by bolts 13 in contact with the band ends 12.

Figure 4:
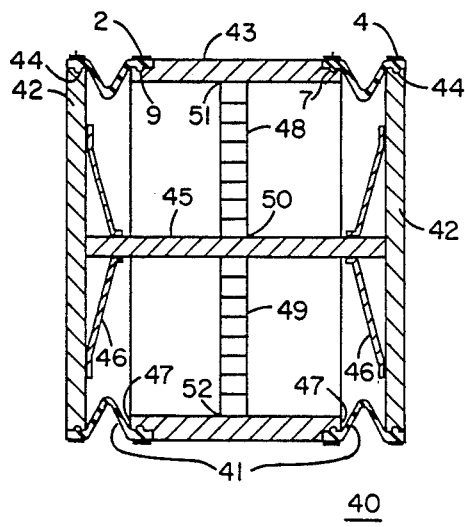
FIG. 4 is a longitudinal sectional view of a flextensional transducer with end caps sealed thereto with the rolling seal of this invention.
Figure 5:
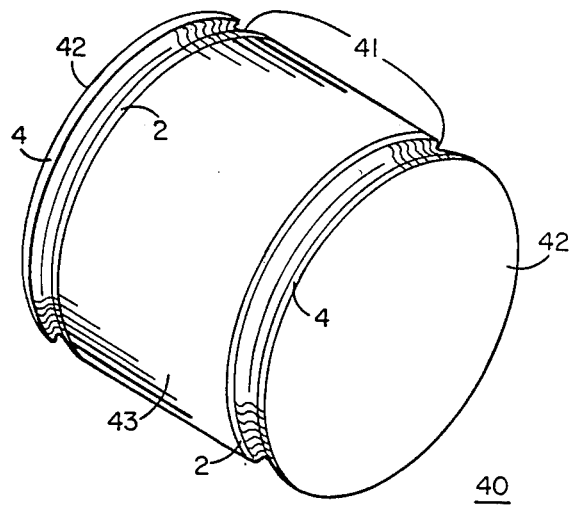
FIG. 5 is an isometric view of the flextensional transducer of FIG. 4.

FIG. 4 shows a cross-sectional view taken along the axis of symmetry of an elliptically shaped flextensional transducer 40 of which an isometric view is shown in FIG. 5. In the conventional prior art form of elliptical flextensional transducer, the end plates are bolted to a shell with an intervening rubber ring to provide a watertight seal. Electrical energization of the transducer causes the shell to move relative to the end plates thereby producing shear losses in the rubber sealing ring which reduces the efficiency of the transducer.

In the present invention as illustrated in FIGS. 4 and 5, the transducer 40 is provided with a watertight seal 41 which is located between the end plates 42 and the shell 43. The seal 41 is the same as the seal 10 of FIG. 2. The end plate 42 has a peripheral groove 44 corresponding to the groove 7 of shell 5 of FIG. 2. Instead of the end plate 42 being clamped to the shell 43 as in the prior art, the rolling seal 41 allows a different form of construction wherein the end plates 42 are supported by an axial rod 45 which is fastened to the end plates 42. As part of the fastening mechanism reinforcing rods 46 extending from the supporting rod 45 to the end plates 42 to maintain the end plates 42 substantially parallel to one another and to the edges 47 of shell 43. The rods 45, 46 prevent the end plates 42 from moving inwardly under the pressure of deep ocean depths in which the transducer 40 may be submerged which without the bars 45, 46 would cause an end plate 42 to compress the rolling seal 41 against the shell 43. The bar 45 is supported at its center 50 by compression contact with the one end of each of the ceramic stacks 48, 49 whose other 51 ends are in contact with the shell 43 as in prior art elliptical flex-tensional transducers. Bar 45 being at the middle of the ceramic drive stacks 48, 49 is therefore at a nodal point which causes the end plates to be stationary while the shell can be undergoing substantial elongation caused by the electrical activation of the ceramic stacks 48, 49. It will be recognized for those skilled in the art that instead of the electrostrictive or piezoelectric drive shown in FIG. 4, the drive mechanism may be a magnetostrictive drive. It will also be apparent to those skilled in the art that inward movement of the plates 42 toward the shell 43 may be restricted by forms of construction other than rod 45 shown in FIG. 4. For example, end plates 42 may be connected to shell 43 by bolts which prevent inward motion of the end plates 42 while the bolts connected to the nodal points of the elliptical shell 43 of the transducer 40 whereby there is substantially no radial movement of shell 43 to be transmitted to the plate 42.

In summary, the invention of this application provides a joint for shells which uses rolling seal motion to provide low resistance to motion between the shells and effects a pressure tight seal at the joint which can be repeatedly assembled and disassembled. The invention is suitable for any axial assembly of shells which must move radially relative to one another during operation, which must be pressure tight, and which preferably are easily assembled and disassembled. Typically, underwater flextensional transducers comprised of elliptical shells and end caps may be joined together by the joint of this invention. The shells vibrate freely with respect to each other and with respect to their end caps. The invention avoids resistance to the shell motion such as occurs in the prior art at a sliding joint or due to shearing of an elastomer seal reduces the efficiency of the transducer. Other applications of this invention include pipe joints which must move due to vibration in order to minimize stresses at these joints.

For any particular application, the roll seal material thickness or material type must be chosen to withstand the pressure loads imposed upon the seal either external to the seal or internal to the pipes which it may be joining. In internal pressure, the U-shaped portion of the seal would extend radially outward. The joint band materials must also be chosen based upon environmental conditions.

An advantage of the rolling seal joint over previously used joints is that there is a minimization of resistance to motion between adjoining shell sections. Another advantage is that potting of elastomers to the shells at the time of assembly is not required. Disassembly effort and cost are also reduced.

A rolling seal joint has been described which comprises either axially-spaced adjacent shells or a shell and an end plate which are joined together by a roll seal having a convolute shape, the roll seal material being attached to each shell or end plate by either a tightening band, or if a permanent joint is desired, by a suitable adhesive to form a watertight joint. The assembled joint offers low resistance to motion between shells because of the rolling motion of the convolute-shaped roll seal in position between the shells. Such a joint is pressure tight and can be easily disassembled and assembled repeatedly without destroying their old seal.

Obviously, many modifications and variations of the present invention may become apparent in light of the above teachings. For example, shells of materials other than metal may be joined in this manner, or roll seals of other materials than rubber may be used. Shells and seals with shapes other than cylindrical or elliptical cross-sections such as cones, ogive, and parabolas may be joined in this manner. Seals having more than one convolution may be used to permit larger sliding motions.

Having described a preferred embodiment of the invention, it will be apparent to one of skill in the art that other embodiments incorporating its concept may be used. It is believed, therefore, that this invention should not be restricted to the disclosed embodiment but rather should be limited only by the spirit and scope of the appended claims.

What is claimed is:

1. A joint seal comprising:
   a pair of transducers, each having a shell having an interior;
   said shells each having a continuous periphery and an end having an opening to said interior;
   said shell ends being spaced from each other to form a gap between said ends;
   a flexible material joined by attachment to said shell ends forming a watertight barrier to said shell interior; and
   said material having a looped portion substantially extending into the gap between said shell ends causing a rolling seal motion which provides low resistance to motion between the shells 2. The seal of claim 1 wherein said attachment comprises means for compressing said material against said shell ends to provide a watertight attachment.

3. The seal of claim 2 wherein said means for compressing comprises a band peripherally encompassing said shell.

4. The seal of claim 3 wherein said band comprises screw means for tightening said band against said material and said shell.

5. The seal of claim 2 wherein said attachment further comprises:
   said material having peripheral beads under said means for compressing; and
   said shells having peripheral grooves each one mating with one of said peripheral beads.

6. The seal of claim 1 wherein:
   said transducers are flextensional transducers having shells of substantially elliptical external periphery; and
   said transducers have an axis of symmetry which are in axial alignment.

7. The seal of claim 1 wherein said material is impermeable to water and to a gas.

8. The seal of claim 7 wherein said gas is sodium hexafluoride sealed within said shell interior.

9. A joint seal comprising:
   a transducer of the type having at least one portion movable with respect to another adjacent portion;
   said portions being separated by a gap and having adjacent edges;
   a seal for said gap comprising a flexible member;
   means for attaching said member to each of said edges;
   said member having a loop in said gap substantially extending into said gap; and
   said seal providing a watertight coupling between said portions causing a rolling seal motion which provides low resistance to motion between the shells 10. The seal of claim 9 wherein said means for attaching comprises joint bands, each one compressing said flexible member against one of each of said edges to provide a water-tight attachment between said flexible member and said edges.

11. The seal of claim 10 wherein said means for attaching further comprises:
    said flexible member having a bead at said different regions; and
    said edges against which said different regions are compressed each having a groove mating with said bead respectively.

12. The seal of claim 9 wherein:
    said transducer having an interior sealed from its exterior and containing a gas in said interior; and
    said flexible member and said seal being impervious to said gas.

13. The seal of claim 9 wherein:
    said transducer being a flextensional type having a shell as said one portion and at least one end plate as said another adjacent portion; and
    said shell having a surface periphery which is continuous without an axial gap.

* * * * *